United States Patent
Yamada

(10) Patent No.: US 9,146,489 B2
(45) Date of Patent: Sep. 29, 2015

(54) IMAGE FORMING APPARATUS, METHOD OF CONTROLLING THE SAME AND STORAGE MEDIUM

(71) Applicant: CANON KABUSHIKI KAISHA, Tokyo (JP)

(72) Inventor: Masayuki Yamada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/083,767

(22) Filed: Nov. 19, 2013

(65) Prior Publication Data

US 2014/0160511 A1 Jun. 12, 2014

(30) Foreign Application Priority Data

Dec. 7, 2012 (JP) .................................. 2012-268809

(51) Int. Cl.
*H04N 1/00* (2006.01)
*G03G 15/00* (2006.01)
*G06F 9/44* (2006.01)
*H04N 1/32* (2006.01)

(52) U.S. Cl.
CPC .............. *G03G 15/00* (2013.01); *G06F 9/4446* (2013.01); *H04N 1/00408* (2013.01); *H04N 1/32635* (2013.01); *H04N 1/32657* (2013.01); *H04N 2201/0094* (2013.01)

(58) Field of Classification Search
CPC ....................................................... G06F 3/121
See application file for complete search history.

(56) References Cited

U.S. PATENT DOCUMENTS

| 5,602,625 | A | 2/1997 | Okamoto et al. |
| 2005/0110898 | A1* | 5/2005 | Ryu .............................. 348/372 |

FOREIGN PATENT DOCUMENTS

| JP | 8-69223 A | 3/1996 |
| JP | 8-123259 A | 5/1996 |

* cited by examiner

*Primary Examiner* — Saeid Ebrahimi Dehkord
*Assistant Examiner* — Lennin RodriguezGonzale
(74) *Attorney, Agent, or Firm* — Fitzpatrick, Cella, Harper & Scinto

(57) ABSTRACT

An image forming apparatus, a method of controlling it and a storage medium are described. The apparatus detects an error, reproduces moving images corresponding to operations of an operation procedure for cancelling the error, and detects user operations. When the apparatus detects an operation during reproduction of a corresponding moving image, and the operation is not a last operation, the apparatus reproduces a next operation moving image. When the operation is not detected during reproduction of the corresponding moving image, the apparatus ends reproduction of the moving image. In a case that the operation is detected during reproduction of the corresponding moving image, and the operation is the last operation, the apparatus executes error recovery processing.

16 Claims, 14 Drawing Sheets

F I G. 6
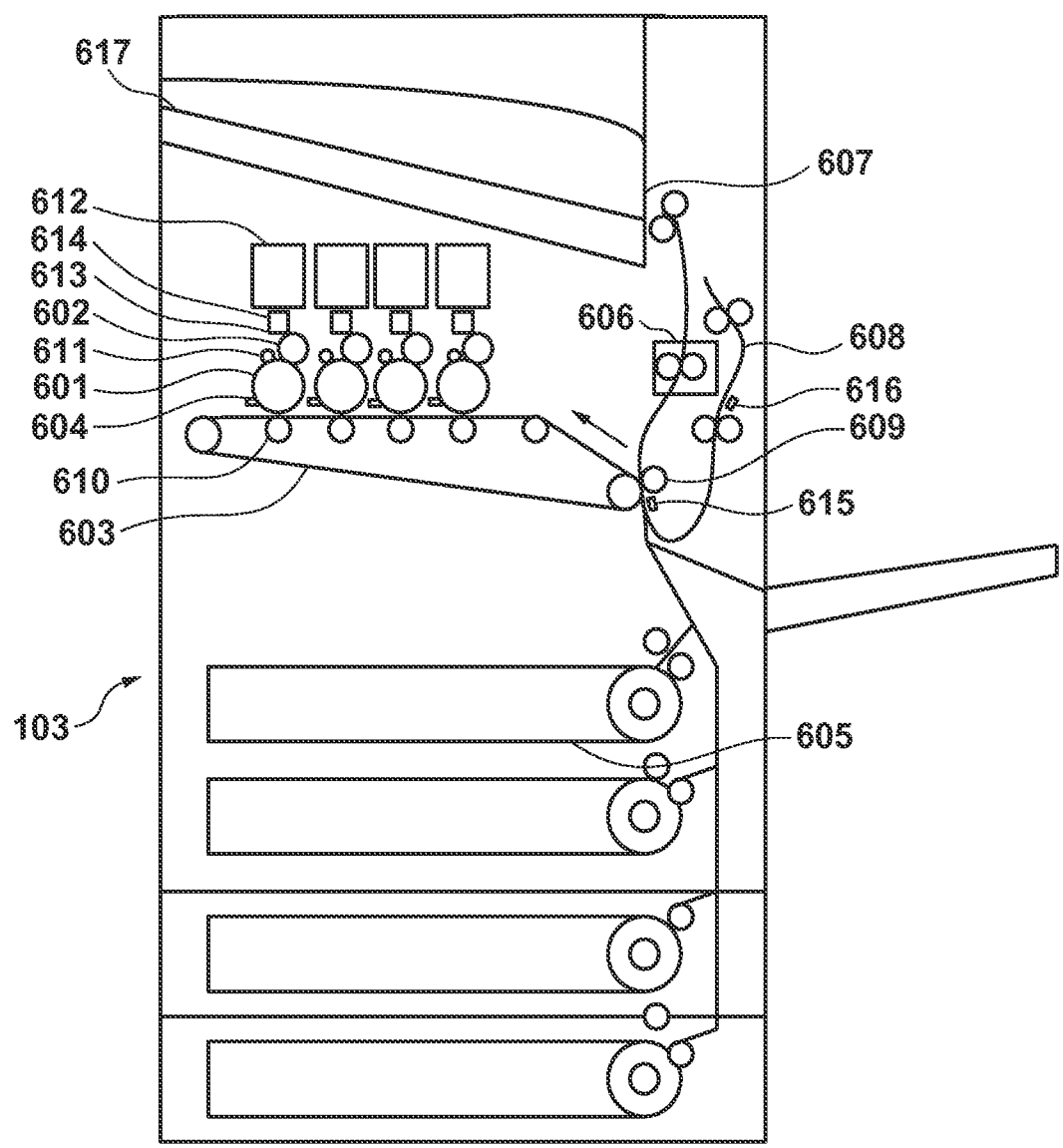

FIG. 8
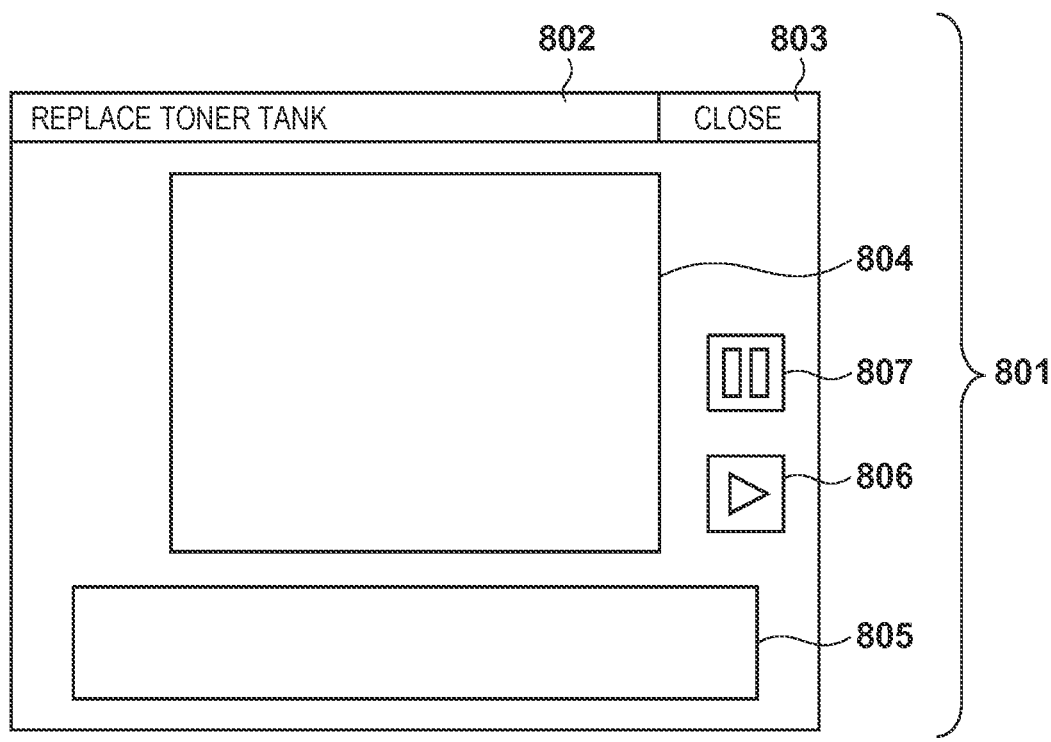
FIG. 9A
| C | M | Y | K |
|---|---|---|---|
| TONER EXISTS | TONER DOES NOT EXIST | TONER EXISTS | TONER DOES NOT EXIST |
FIG. 9B
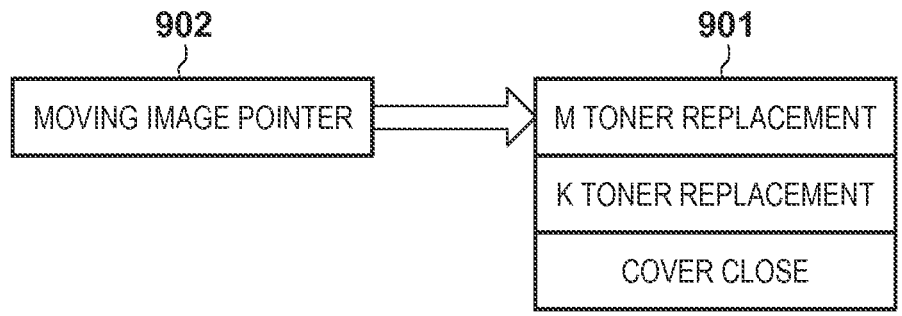

IMAGE FORMING APPARATUS, METHOD OF CONTROLLING THE SAME AND STORAGE MEDIUM

BACKGROUND OF THE INVENTION

1. Field of the Invention

The present invention relates to an image forming apparatus, a method of controlling the same, and a storage medium.

2. Description of the Related Art

There are cases in which user operation is assisted by displaying screens showing such things as a replacement procedure of a toner cartridge in an image forming apparatus, or the like, or a maintenance processing procedure for replacement of a component of the image forming apparatus, or the like, onto a control panel of the image forming apparatus. For example, in Japanese Patent Laid-Open No. H08-069223, in a case where a copying machine paper jam (jam) is detected, a processing procedure for handling the jam is displayed on a control panel as an animation. With this, even a user who is unfamiliar with the operation of the copying machine can easy fix the jam. This kind of display of operation procedures is not limited to jam processing, and may also be used for other operation guidance (for example, see Japanese Patent Laid-Open No. H08-123259).

Also, in Japanese Patent Laid-Open No. H08-069223, the animation that shows the operation procedure is displayed in operation reproduction units in accordance with operation steps such as "door opening guidance" and "reversing path guidance". Upon detection of a jam or running out the toner, an animation of appropriate reproduction units is put together in accordance with the state of the device for which the detection was made and reproduced. In such a case, after the display of each reproduction unit of an animation, display of the next reproduction unit of the animation is started by the user by operation of a next key. When the next key is pressed after display of the final reproduction unit of the animation, the first reproduction unit of the animation is once again displayed. Alternatively, each reproduction unit is consecutively displayed by automatic operation of the next key (when the display of a reproduction unit completes, display of the next reproduction unit starts automatically), and after display of the final reproduction unit, the first reproduction unit is once again displayed automatically.

In general, circumstances of detection of a state of a device do not necessarily change immediately in accordance with user operation or processing on the device. For example, in a case where toner runs out, an out of toner state is not cancelled immediately when the user replaces the toner bottle. After the user replaces the toner bottle, a supply operation supplying toner from the toner bottle is started when a main unit cover for toner replacement is closed. When the toner is then supplied, the toner is detected and the out of toner state is cancelled. Similarly, in a case where a jam is detected, the jam is not cancelled just by the user removing a sheet that is the cause of the jam. After the user removes the sheet, and closes the main unit cover, a conveyance motor is rotationally driven, a remaining paper check is executed, and only when it is detected that there is no remaining paper is the jam cancelled.

This means that in the above described conventional technique explanation, in a state in which after the final reproduction unit is displayed, display of the first reproduction unit is returned to (a state in which guidance looped once), there are cases in which inconsistencies arise between the displayed reproduction unit and the actual state of the device. After replacement of the toner bottle, for example, because a display sequence of the reproduction units is not updated by the replacement alone, when the first reproduction unit is returned to and displayed, again the reproduction unit showing an initial procedure for replacing the toner bottle is displayed. This can lead to confusion of the user.

Also, in a case where the next reproduction unit is displayed due to a user operation such as a pressing of the next key, there are cases where the user does not notice the operation for progressing to the next reproduction unit (does not notice the existence of the next key). When the toner bottle is replaced, for example, there is the possibility that the user, expecting that transition to the display of the next operation procedure will happen automatically, becomes confused when the displayed content does not change, even though the toner bottle has been replaced.

Meanwhile, in a case where the display transitions to the first reproduction unit automatically after the final reproduction unit is displayed, there are cases when the display content change between the final reproduction unit display and the first reproduction unit display feels unnatural. For example, operations such as replacement of toner bottles and jam processing begin with an operation of opening the main unit cover and end with an operation of closing the cover. Particularly in a case where this is displayed in an animation having few frames, after a final "cover closing" operation procedure is displayed, the start is returned to and a "cover opening" operation procedure is displayed. So, because the animations instructing "cover closing" and "cover opening" are repeatedly displayed in a state in which the main unit cover is open, there is the possibility that the user will be confused about the operation.

SUMMARY OF THE INVENTION

An aspect of the present invention is to eliminate the above-mentioned problems with the conventional techniques.

A feature of the present invention is to provide a technique in which it is possible to show a procedure by which a user can easily and reliably cancel an error state when an operation procedure for cancelling the error state is displayed in a moving image.

According to an aspect of the present invention, there is provided an image forming apparatus. The apparatus comprises a detection unit configured to detect an error state of the apparatus, a reproduction unit configured to reproduce moving images, respectively corresponding to a plurality of operations comprising in an operation procedure for cancelling the error state, for predetermined times respectively, an operation detection unit configured to detect an operation on the apparatus by a user, a control unit configured to control so that when the operation detection unit detects a first operation from out of the plurality of operations while a first moving image corresponding to the first operation is being reproduced by the reproduction unit, a second moving image corresponding to a second operation from out of the plurality of operations that follows the first operation is caused to be reproduced by the reproduction unit if the first operation is not a last operation of the plurality of operations, and so that in a case that the operation detection unit does not detect the first operation while the first moving image is being reproduced by the reproduction unit, reproduction of the first moving image by the reproduction unit is caused to end and a recovery unit configured to execute processing for recovering from the error state in a case that the operation detection unit detects the first operation while the first moving image is being reproduced by the reproduction unit, and the first operation is the last operation of the plurality of operations.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3A shows a state in which a cover for toner replacement is closed while FIG. 3B shows a state in which the cover for toner replacement is open.

FIG. 6 is a view for explaining a configuration of a printer engine according to some embodiments.

FIG. 8 is a view for showing an example of a toner replacement screen for instructing toner replacement.

FIG. 9A is a view for showing an example of toner statuses, and FIG. 9B is a view for showing an example of a moving image list.

DESCRIPTION OF THE EMBODIMENTS

Embodiments of the present invention will be described hereinafter in detail, with reference to the accompanying drawings. It is to be understood that the following embodiments are not intended to limit the scope of the claims of the present invention, and that not all of the combinations of the aspects that are described according to the following embodiments are necessarily required with respect to the means to solve the problems according to the present invention.

Figure 1:
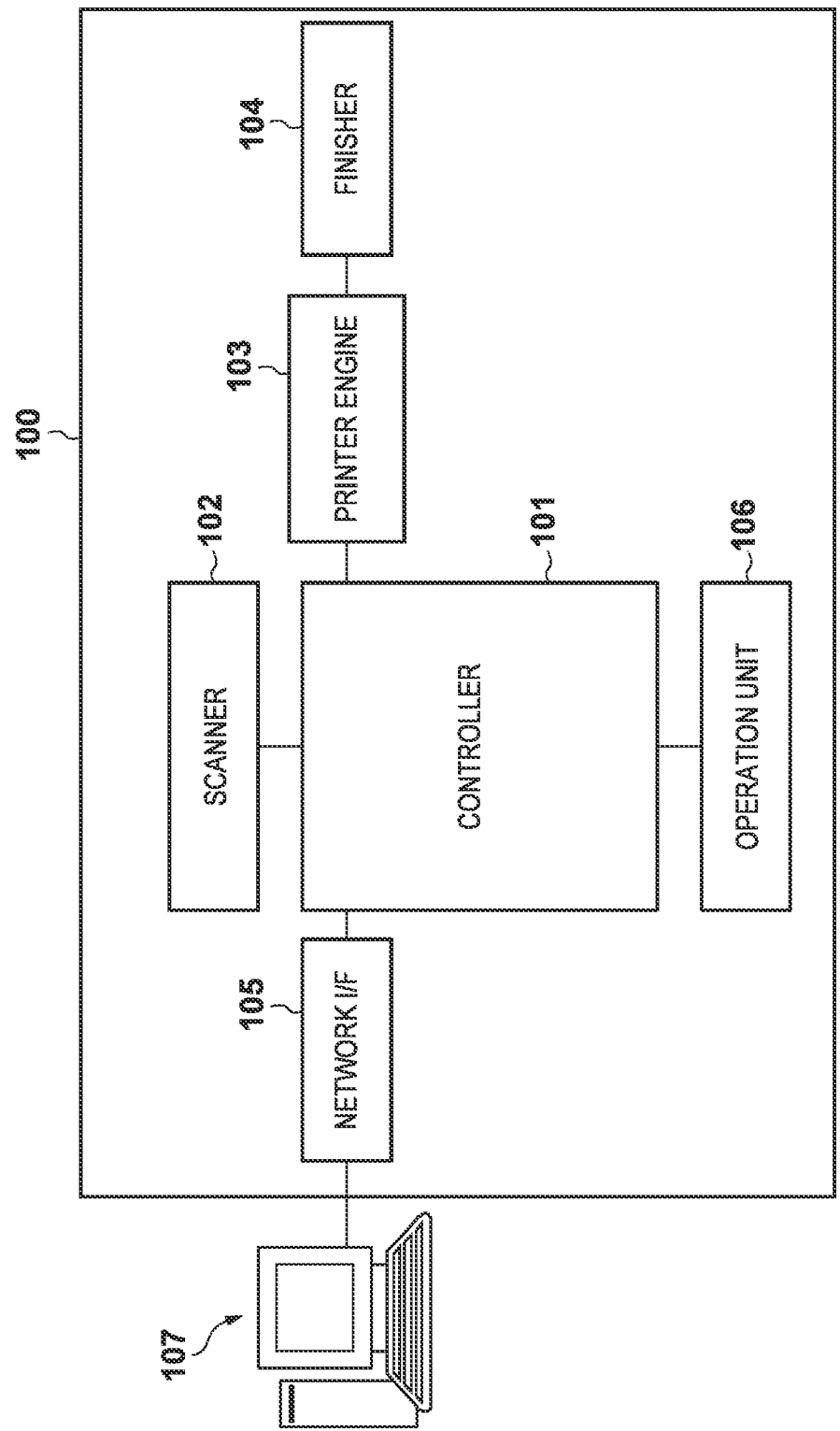
FIG. 1 is a block diagram for illustrating a configuration of a multi function peripheral (MFP) which is one example of an image forming apparatus according to some embodiments of the present invention.

FIG. 1 is a block diagram for illustrating a configuration of a multi function peripheral (MFP) which is one example of an image forming apparatus according to some embodiments of the present invention.

Figure 2:
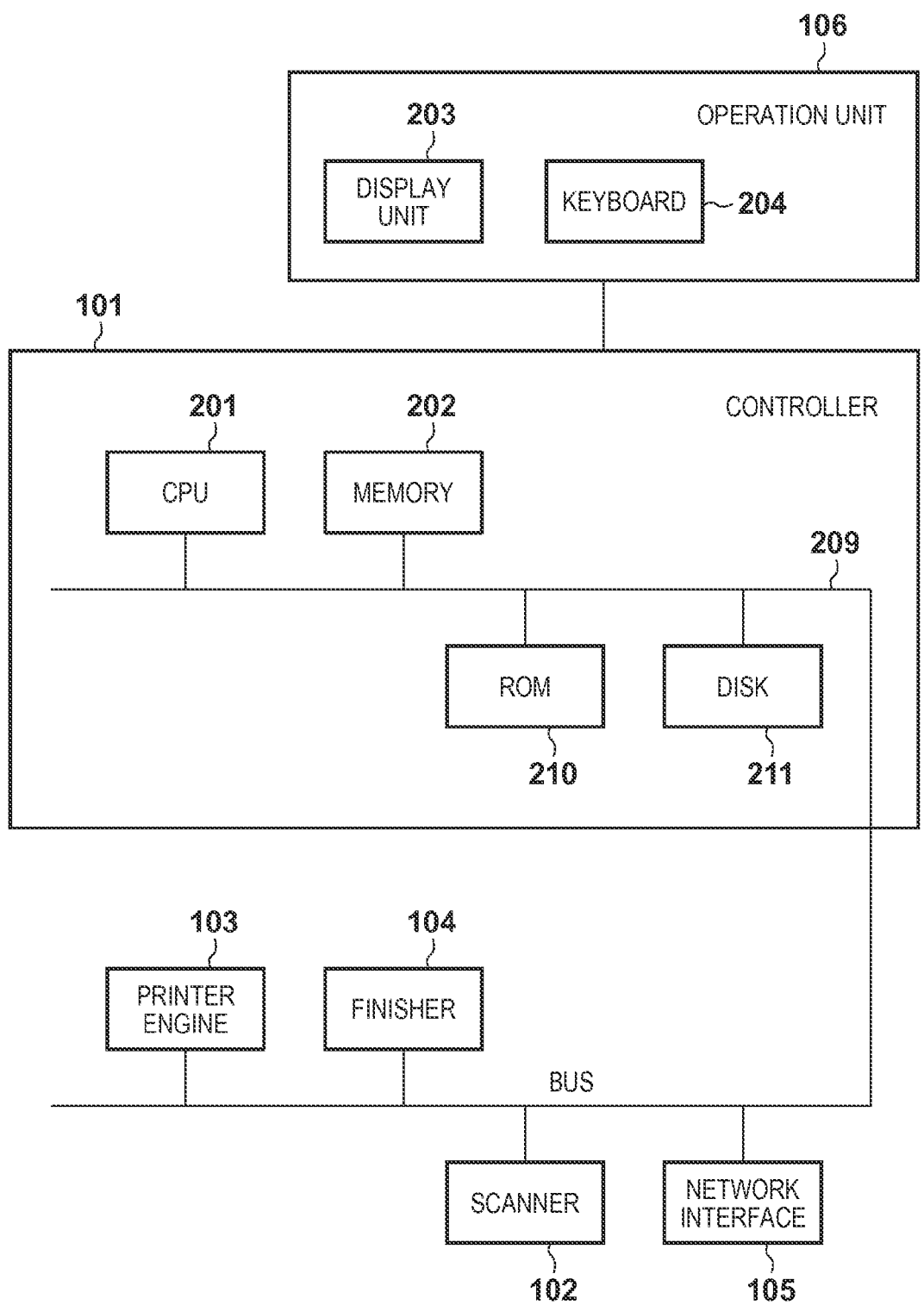
FIG. 2 is a block diagram for explaining a hardware configuration of a controller, and connected peripheral portions, according to some embodiments.

A controller 101 controls a multi function peripheral (MFP) 100, and has a hardware configuration shown in FIG. 2. A scanner 102 scans an original under the control of the controller 101, and generates image data thereof. A printer engine 103 is an electrophotographic method printer engine in this case, and prints an image onto a sheet based on image data under the control of the controller 101. A finisher 104 is connected to the printer engine 103 and is capable of performing post-processing such as stapling and binding on a plurality of storage mediums (sheets) output from the printer engine 103. The finisher 104 is controlled by the controller 101. A network interface 105 provides bidirectional communication via a network to the controller 101, and is connected via the network to a personal computer (PC) 107. An operation unit 106 has a display unit such as a liquid crystal display and a keyboard, and as well as displaying information from the controller 101, it conveys information input from the user to the controller 101. Note, the display unit may have a touch panel function.

FIG. 2 is a block diagram for explaining the hardware configuration of the controller 101, and connected peripheral portions, according to some embodiments.

Within the controller 101 via a bus 209, a CPU 201, a memory 202, a ROM 210, and a disk 211 are connected. Various programs and data are stored in the disk 211 (storage medium) such as a hard disk or a floppy (registered trademark) disk, and are read out of the memory 202 sequentially and executed by the CPU 201 as necessary. The disk 211 may be removable from the MFP 100, or embedded into the MFP 100. Furthermore, configuration may be taken so that the programs may be downloaded from another MFP, a PC, or the like, via the network and stored in the disk 211.

Also, the memory 202 may be a volatile memory such as a DRAM or a non-volatile memory such as an SRAM, or the memory 202 may have both such functions. Alternatively, configuration may be taken so that the memory 202 handles the volatile memory function and the disk 211 handles the non-volatile memory function. Also, the memory 202 may be removable memory media.

The CPU 201 performs display by writing display data to display memory of a display unit 203. Also, the CPU 201 receives instructions from a user inputted on the operation unit 106 by as data input from a keyboard 204 or the display unit 203, which is touch panel enabled. The input information is stored in the memory 202 or the disk 211 and used for various processing.

Also, the network interface 105 is connected to the bus 209, and the CPU 201, by reading data or writing data via the network interface 105, performs communication using the network. Furthermore, the printer engine 103, the finisher 104, and the scanner 102 are connected to the bus 209. The CPU 201 carries out engine operation for printing, scanning and the like, and acquires various statuses by reading and writing data to corresponding engines.

Image data input from the scanner 102 or the network interface 105 is stored in the disk 211 of the controller 101 or in the memory 202. Also, it is possible to acquire image data by pre-storing the image data in the memory 202, in a case where the memory 202 is removable, by mounting the memory 202 to the controller 101. Image data stored in the disk 211 may be transferred or copied to the memory 202, and various additional images (for example, page number) can be composited onto the image data in the memory 202 in accordance with information instructed from the operation unit 106.

Note, the printer engine 103, the finisher 104 and the scanner 102 may be configured to exist as stand alone peripherals on the network, rather than within the MFP 100, and the controller 101 of the MFP 100 may be configured to control them.

Figure 3A:
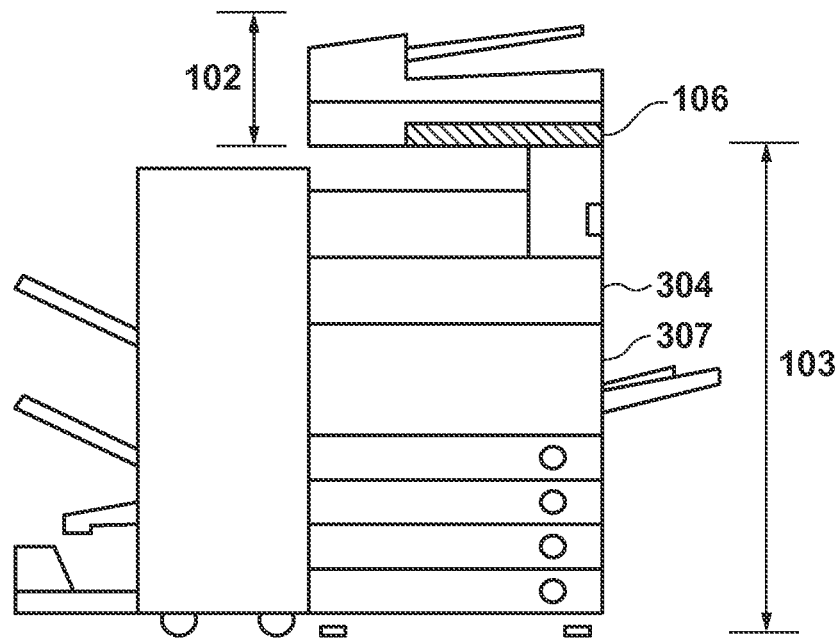
FIG. 3A and FIG. 3B are views for explaining the exterior of the MFP according to the embodiments.
Figure 3B:
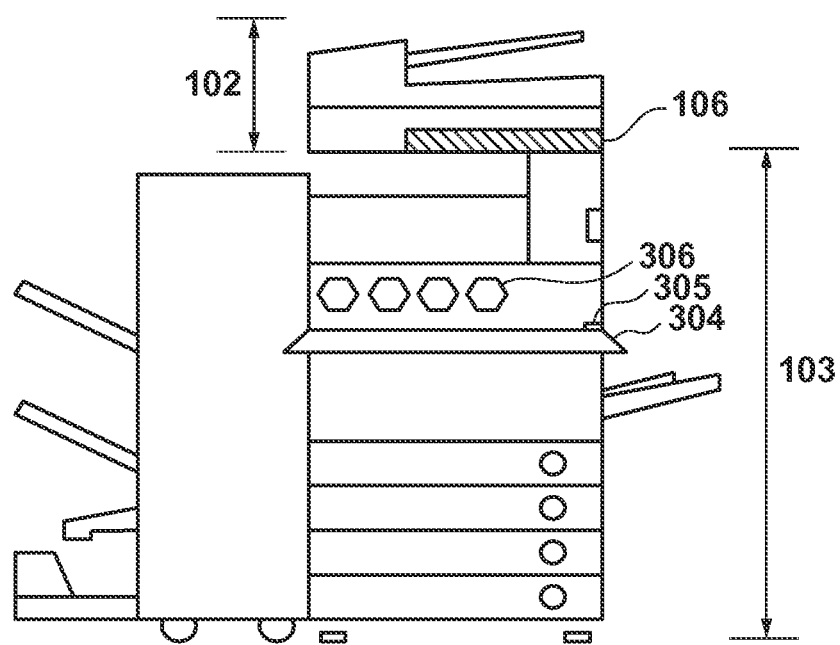

FIG. 3A and FIG. 3B are views for explaining the exterior of the MFP 100 according to some embodiments, and FIG. 3A shows a state in which a cover 304 for toner replacement is closed while FIG. 3B shows a state in which the cover 304 for toner replacement is open.

The scanner 102, as an image input device, illuminates an image on an original, and converts the image on the original into electronic image data by reading reflected light with a CCD line sensor. From this converted image data, color determination and size determination of the original are performed. The printer engine 103, as an image output device, prints the image on the sheet in accordance with the image data, and after the printing performs processing such as stapling and binding with the finisher 104 on the printed sheet.

The cover 304 for toner replacement is opened when toner of the printer engine 103 is replaced. FIG. 3B shows a state in which the cover 304 for toner replacement is open. On a back of the cover 304 for toner replacement, an opening and closing sensor 305 for the cover 304 is arranged, and it is possible to detect an open/close status of the cover 304 for toner replacement with the sensor 305. Four instances of a toner bottle cover 306 are arranged in accordance with the number of colors used by this MFP 100 as an example. Behind the toner bottle covers 306 are stored the toner bottles. Furthermore, in the printer engine 103 a main unit cover 307 is arranged (FIG. 3A).

Figure 4:
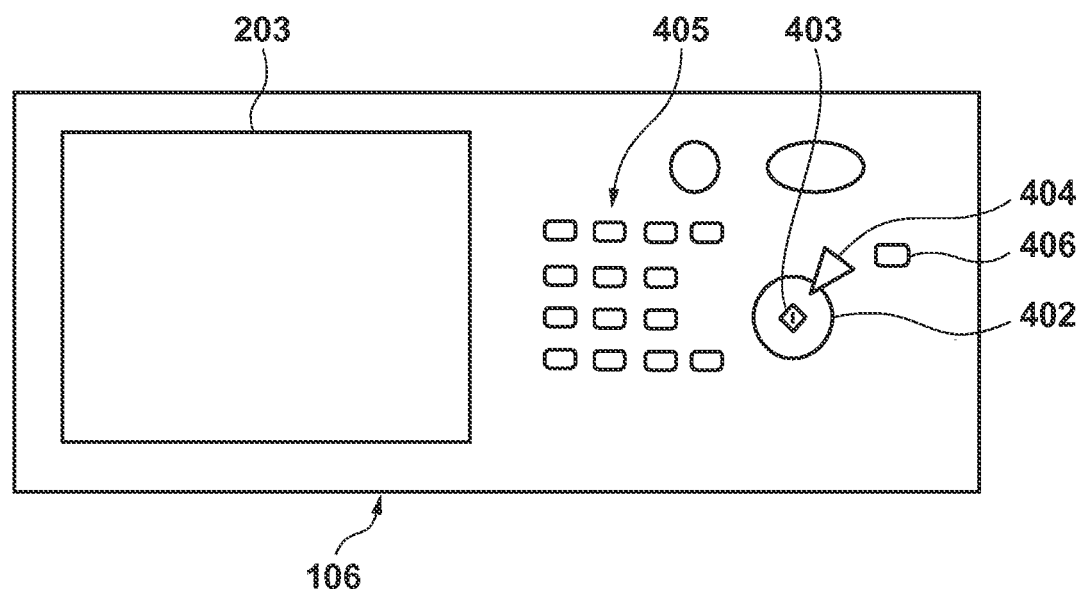
FIG. 4 is a top view of an operation unit on the image forming apparatus (MFP) according to some embodiments.

FIG. 4 is a top view of the operation unit 106 on the image forming apparatus (MFP) 100 according to some embodiments.

The display unit 203 comprises a touch panel sheet affixed to the liquid crystal display, and as well as displaying operation screens and softkeys it conveys position information, when a displayed softkey is pressed, to the CPU 201 of the controller 101. A start key 402 is used for instructing starting of a read operation for reading an original or starting of a facsimile transmission. In a center part of the start key 402 is a dual color LED 403 having both green and red colors, and indication of whether or not the current state is such that the start key 402 can be used is made depending on the color. A stop key 404 stops an in-progress operation. A numeric keypad 405 is comprised of a group of numeral and character buttons, and instructs a setting of a number of copies or a switching of screens of the display unit 203. A user mode key 406 is pressed when performing device setting. The previously described keyboard 204 corresponds to these hard keys.

Figure 5:
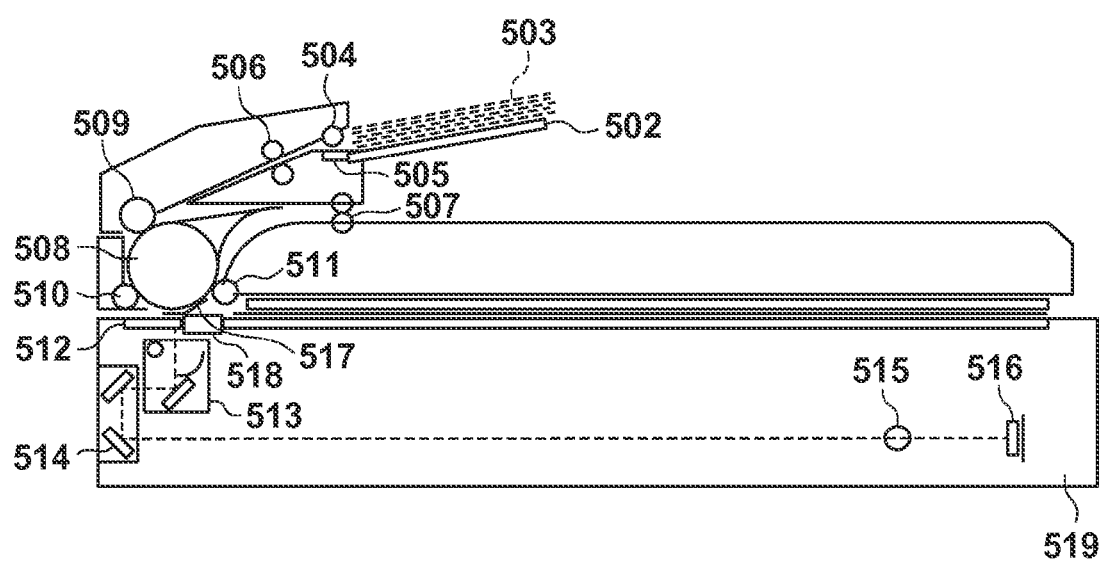
FIG. 5 is a view for explaining a configuration of a scanner according to some embodiments.

FIG. 5 is a view for explaining a configuration of a scanner 102 according to some embodiments.

Information on an original 503 is read while causing the original 503 to move relatively to an exposure unit 513 of an original image reading apparatus 519. The original 503 is set on an original tray 502. An original feed roller 504 is paired with a separation pad 505, and the original 503 is conveyed one sheet at a time. The conveyed original 503 is sent into the scanner by an intermediate roller 506, conveyed by a large roller 508 and a first driven roller 509, and further conveyed by the large roller 508 and a second driven roller 510. The original 503, having been conveyed by the large roller 508 and the driven roller 510, passes between a flow reading original glass 512 and an original guide plate 517, and is conveyed by the large roller 508 and a third driven roller 511 via a jump stand 518. The original 503, having been conveyed by the large roller 508 and the driven roller 511, is discharged out of the scanner by an original discharge roller pair 507. Note that between the flow reading original glass 512 and the original guide plate 517, the original 503 is conveyed by the original guide plate 517 so as to contact the flow reading original glass 512.

When the original 503 passes over the flow reading original glass 512, the surface contacting the flow reading original glass 512 is exposed by the exposure unit 513. As a result, the reflected light from the original 503 is transmitted to the mirror unit 514. The reflected light, having been thus transmitted, passes through a lens 515, is condensed, is converted by a CCD sensor unit 516 into an electrical signal, and is transmitted to the controller 101.

FIG. 6 is a view for explaining a configuration of the printer engine 103 according to some embodiments. This view shows an example of a printer engine of a full color image forming apparatus.

A photosensitive drum 601 is charged by charge processing by a primary charger 611 to a particular polar potential, and a surface of the photosensitive drum 601 is exposed in accordance with an instruction from the controller 101 by an exposure unit (not shown). With this, an electrostatic latent image corresponding to a first color component is formed. After that, developing is performed using toner in a developer 602. The toner in the developer 602 is supplied via a hopper 613 from a toner bottle 612. An intermediate transfer belt 603 is driven in the direction of the arrow symbol, and in a process of a color component image formed on the photosensitive drum 601 passing through a junction part of the photosensitive drum 601 and the intermediate transfer belt 603, the color component image is transferred to the intermediate transfer belt 603 due to an electric field formed by a primary transfer roller 610. The surface of the photosensitive drum 601 is cleaned by a cleaning device 604 after transfer to the intermediate transfer belt 603.

The printer engine 103 has four sets of the photosensitive drum 601, the primary charger 611, the developer 602, the toner bottle 612, the hopper 613 and the cleaning device 604, making four color component image forming systems. The image forming systems form a color image by overlaying images in the four colors onto the intermediate transfer belt 603. In a case of forming a monochrome image, only the corresponding image forming system performs transfer processing. An image transferred to the intermediate transfer belt 603 is transferred by a secondary transfer roller 609 onto a sheet fed from a cassette 605. The sheet, having had the image printed onto it, is fixed by being heated by a fixing unit 606. After fixing, the sheet is conveyed through a location indicated by numeral 607 to a discharge orifice 617 and discharged from the MFP 100. In a case where double-sided printing is performed, the sheet is circulated through a reversing path 608, and print processing is repeated.

Also, on an upper part of the hopper 613 a toner detection sensor 614 is arranged, enabling detection of toner in the hopper 613. Also, on a sheet conveying path, paper detection sensors 615, 616 are arranged. As a result of detection by the paper detection sensors 615, 616, it is determined that a jam has occurred in the following cases:

a case where a paper detection sensor continues to detect a sheet for more than a time period calculated from a sheet conveying speed (retention jamming)

a case where a time until the next sheet is detected by a paper detection sensor after a paper detection sensor stops detecting a particular sheet exceeds a time period calculated from the sheet conveying speed (delay jamming)

Here, explanation will be given for a moving image using in some embodiments.

In some embodiments, moving images used for operation procedure guidance corresponding to the above described error states are moving images that have captured actual user operation in each reproduction unit corresponding to an operation step such as "cover for toner replacement opening", or "cyan toner replacement", or the like. Each moving image is stored as an operation step (hereinafter referred to as a "scene") associated file in the disk 211, and displayed for a predetermined time period. Note, for a file format and a reproduction method of the moving image, known technologies of MPEG and motion JPEG may be used.

[First Embodiment]

Figure 7A:
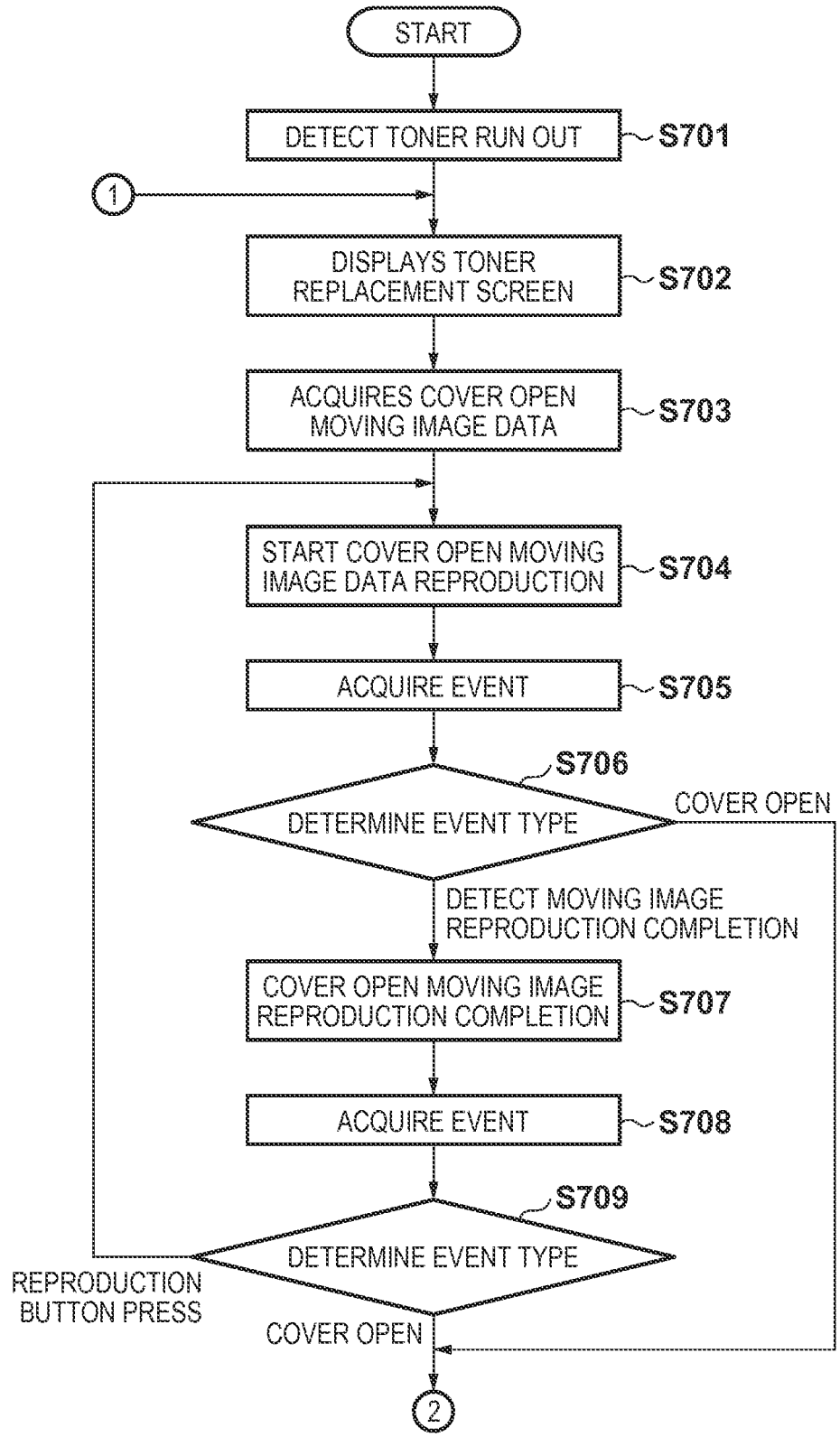
FIG. 7A and FIG. 7B are flowcharts for describing reproduction processing of a moving image for showing an operation procedure when toner runs out in the image forming apparatus according to a first embodiment.
Figure 7B:
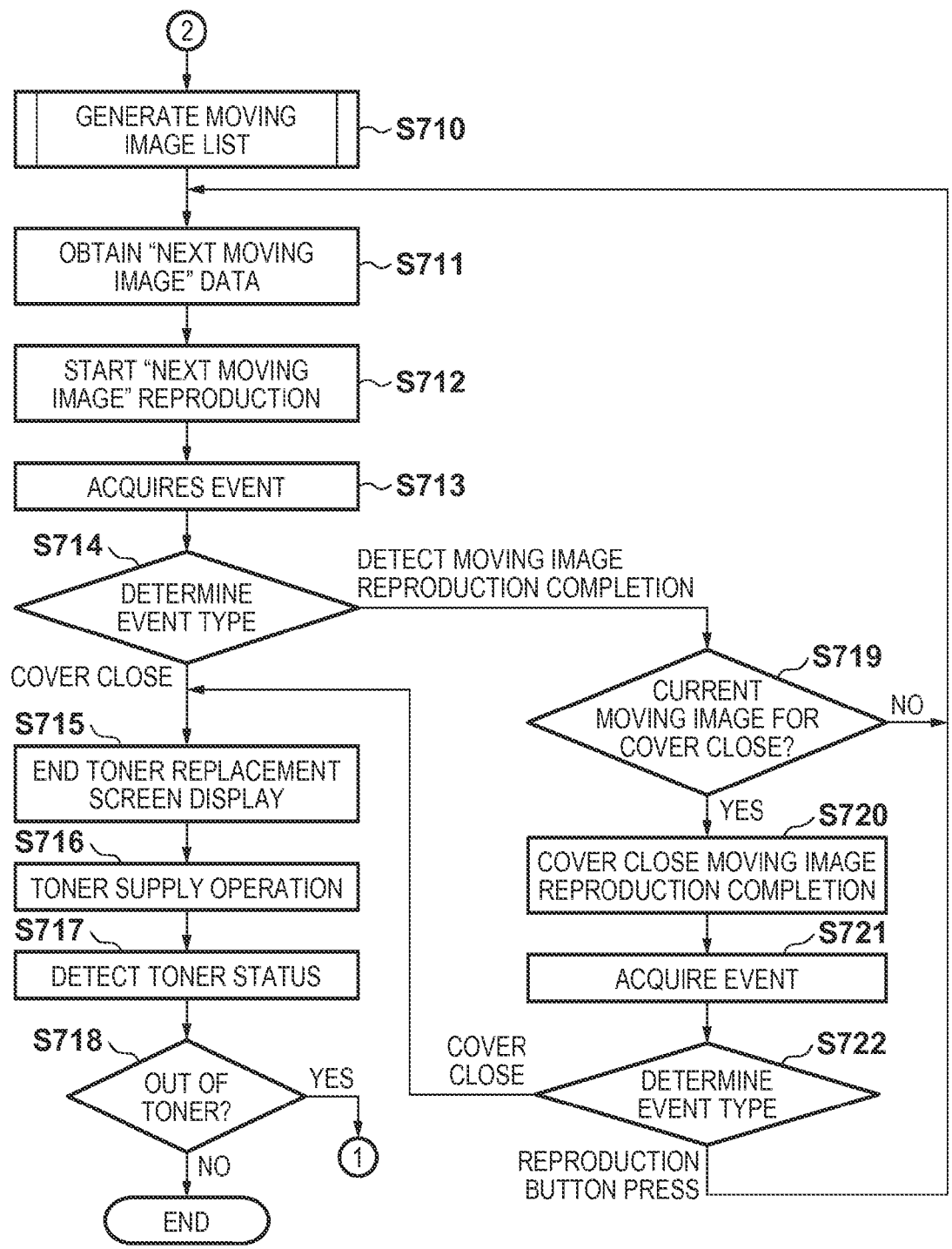

FIG. 7A and FIG. 7B are flowcharts for describing reproduction processing of a moving image for showing an operation procedure when toner runs out in the image forming apparatus according to a first embodiment. A program for executing this processing may be loaded into the memory 202 upon execution and executed under the control of the CPU 201.

Firstly, in step S701, the CPU 201 detects that toner has run out. After the toner detection sensor 614 on the upper part of the hopper 613 stops detecting toner, a predetermined amount of toner is supplied to the developer 602 from the hopper 613. At this point, an out of toner event is dispatched from the printer engine 103 to the CPU 201 and by receiving this event, the CPU 201 detects that toner has run out. The CPU 201 records information of the detected out of toner event as a toner status.

FIG. 9A is a view for showing an example of the toner status.

The toner status maintains one of two states ("toner exists" or "toner does not exist") for each of the colors cyan (C), magenta (M), yellow (Y) and black (K) in the memory 202.

Next, the processing proceeds to step S702 and the CPU 201 displays a screen instructing toner replacement onto the display unit 203.

FIG. 8 is a view for showing an example of a toner replacement screen 801 for instructing toner replacement.

On the toner replacement screen 801, a screen title 802, a close button 803, a moving image display area 804, a message display area 805, a reproduction button 806 and a pause button 807 are arranged.

Returning to the explanation of the flowchart, next, the processing proceeds to step S703, and the CPU 201 acquires moving image data for displaying a procedure for opening the cover 304 for toner replacement from the disk 211. Next, the processing proceeds to step S704 and the CPU 201 initiates reproduction of the moving image showing the procedure for opening the cover 304 based on the moving image data acquired in step S703. The moving image that is reproduced is displayed on the moving image display area 804. Note, the reproduction of the moving image operates according to a separate flowchart to the flowcharts of FIG. 7A and FIG. 7B, and when the reproduction of the moving image concludes, the CPU 201 is notified with an event. Regarding the moving image reproduction processing, known techniques may be used, and so explanation in this embodiment has been omitted.

Next, the processing proceeds to step S705 and the CPU 201 acquires the notification event. Next, the processing proceeds to step S706, and the CPU 201 determines the type of the event acquired in step S705. Here, if the type of the event is for moving image reproduction completion due to the predetermined time period having elapsed (moving image reproduction completion detection), the processing moves to step S707, and if the type of the event is for an opening operation of the cover 304 for toner replacement (cover opening operation detection), the processing proceeds to step S710. Note, when the cover 304 for toner replacement of FIG. 3B is opened (or closed), the open/close status detected by the cover opening and closing sensor 305 is changed. This change is dispatched as an event to the CPU 201 from the printer engine 103.

In step S707, the CPU 201 performs processing corresponding to reproduction completion of the moving image for the scene of opening of the cover 304 for toner replacement. Specifically, on top of the image of the last frame of the moving image for the scene of opening the cover 304 for toner replacement, a button equivalent to the reproduction button 806 is displayed on the moving image display area 804 semi-transparently. Next, in step S708, when an event sent in notification to the CPU 201 is obtained, the processing proceeds to step S709, and the CPU 201 determines what the type of the obtained event is. Here, if the type of the event is for pressing of the button equivalent to the reproduction button 806 (reproduction instruction due to pressing of the reproduction button), the processing is moved to step S704, and reproduction of a moving image showing a procedure for opening the cover 304 is initiated. On the other hand, if the event is for cover opening and due to the cover 304 being opened, the processing proceeds to step S710, and the CPU 201 generates a moving image list. The moving image list is information indicating moving image scenes to be reproduced, and is maintained in the memory 202.

FIG. 9B is a view for showing an example of the moving image list.

In a moving image list 901, moving images for scenes corresponding to "magenta toner replacement", "black toner replacement" and "cover for toner replacement closing" are included. In the view, a moving image pointer 902 that indicates a currently displayed moving image is indicating "magenta toner replacement".

Generation processing of this moving image list is explained later with reference to a flowchart of FIG. 10.

When a subroutine for generating the moving image list in step S710 completes, the processing proceeds to step S711 and the CPU 201 obtains data of the next moving image. Specifically, in the example of FIG. 9B, for example, moving image data associated with the scene indicated by the moving image pointer 902 in the moving image list 901 is acquired from the disk 211. Also, the moving image pointer 902 is moved down by one (in a case where the moving image pointer 902 is indicating the last scene in the moving image list, it is moved to the first scene). Next, the processing proceeds to step S712, and the CPU 201 initiates reproduction of a moving image based on the moving image data acquired in step S711. The processing of step S712 is the same as the processing of previously described step S704.

Next, the processing proceeds to step S713, and the CPU 201 acquires a notification event, and in step S714 the CPU 201 determines the type of the acquired event. Here, if the type of the event is for reproduction completion of the moving image (moving image reproduction completion detection), the processing proceeds to step S719, and if the type of the event is for an operation of closing the cover 304 for toner replacement (cover closing operation detection), the processing proceeds to step S715.

In step S719, the CPU 201 determines whether or not the moving image being reproduced is a moving image corresponding to a scene for closing the cover 304 for toner replacement. In a case where the moving image being reproduced is a moving image corresponding to a scene for closing the cover 304, the processing proceeds to step S720, and if not, the processing proceeds to step S711. In step S720, the CPU 201 performs processing corresponding with a moving image reproduction completion of the scene for closing the cover 304 for toner replacement. Specifically, on top of the image of the last frame of the moving image for the scene of closing the cover 304, a button equivalent to the reproduction button 806 is displayed semi-transparently. Next, the processing proceeds to step S721, the CPU 201 acquires a notification event, the processing proceeds to step S722, and the CPU 201 determines the type of the event acquired in step S721. Here, if the type of the event is for pressing of the button equivalent to the reproduction button 806 (reproduction button pressing), the processing is moved to step S711. On the other hand, if the type of the event is for a closing operation of the cover 304 for toner replacement (cover closing), the processing proceeds to step S715.

In step S715, the CPU 201 ends display of the toner replacement screen 801. At this time, if a moving image is being reproduced, the display of the toner replacement screen 801 is ended after interrupting the reproduction of the moving image. Next, the processing proceeds to step S716, and the CPU 201 performs recovery processing for recovering from the state in which toner does not exist. Specifically, a supply operation of toner from the toner bottle 612 to the hopper 613 is performed. Next, the processing proceeds to step S717, and the CPU 201 detects the toner status. Here, because toner is supplied to the hopper 613 in step S716, a detection status of the toner detection sensor 614 is changed. When the detection status is changed, the CPU 201 updates the toner status shown in FIG. 9A with the changed detection status. Next the processing proceeds to step S718, and the CPU 201 determines whether or not toner has run out based on the toner status detected in step S717. In the toner status of FIG. 9A, if any one of the toner statuses of the four toner colors is in a "toner does not exist" state, the processing proceeds to step S702, and if there is no "toner does not exist" status, the processing completes.

Figure 10:
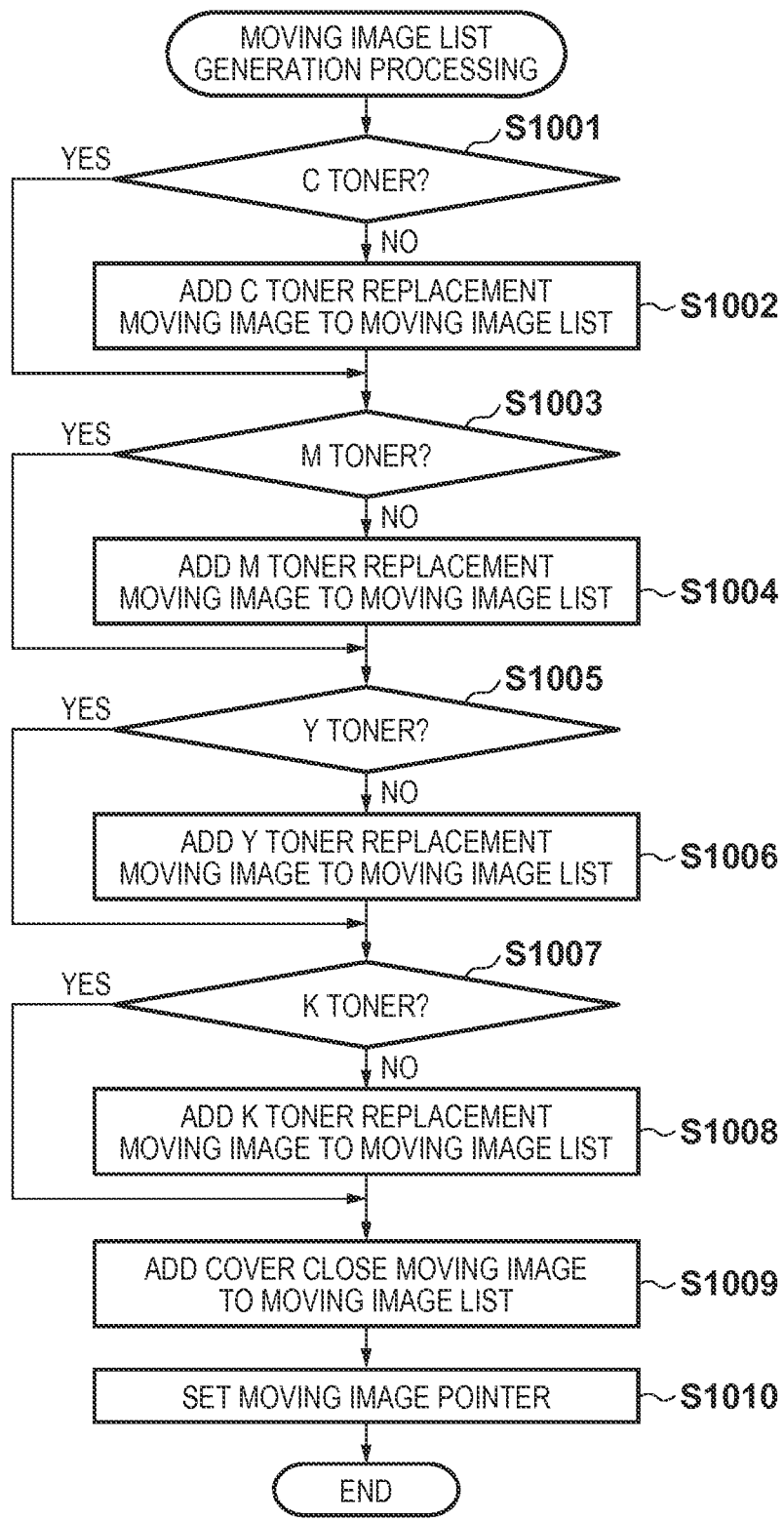
FIG. 10 is a flowchart for describing generation processing for generating a moving image list in step S710 of FIG. 7B.

FIG. 10 is a flowchart for describing generation processing for generating a moving image list in step S710 of FIG. 7B. Below explanation will be given for moving image list generation processing with reference to the flowchart.

Firstly, in step S1001, the CPU 201 references the toner status of FIG. 9A and determines whether or not there is cyan (C) toner. If there is cyan toner, the processing proceeds to step S1003, and if there is no cyan toner, the processing proceeds to step S1002. In step S1002, a moving image for replacement of cyan toner is added to the moving image list, and the processing proceeds to step S1003.

In step S1003, the CPU 201 references the toner status of FIG. 9A, and determines whether or not there is magenta (M) toner. If there is magenta toner, the processing proceeds to step S1005 and if there is no magenta toner, the processing proceeds to step S1004. In step S1004, a moving image for replacement of magenta toner is added to the moving image list, and the processing proceeds to step S1005.

In step S1005, the CPU 201 references the toner status of FIG. 9A, and determines whether or not there is yellow (Y) toner. If there is yellow toner, the processing proceeds to step S1007, and if there is no yellow toner, the processing is moved to step S1006. In step S1006, a moving image for replacement of yellow toner is added to the moving image list, and the processing proceeds to step S1007.

In step S1007, the CPU 201 references the toner status of FIG. 9A, and determines whether or not there is black (K) toner. If there is black toner, the processing proceeds to step S1009, and if there is no black toner, the processing is moved to step S1008. In step S1008, a moving image for replacement of black toner is added to the moving image list, and the processing proceeds to step S1009.

In step S1009, the CPU 201 adds a moving image for closing the cover 304 for toner replacement to the moving image list. Next, the processing proceeds to step S1010, and the moving image pointer 902 is set. The moving image pointer is information indicating a moving image in the moving image list to be reproduced, and is maintained in the memory 202. In step S1010, the moving image pointer 902 is set so as to indicate the first moving image in the moving image list.

By the above explained embodiment, when toner runs out, moving images for operation procedure up until the opening of the cover for toner replacement and moving images for operation procedure from the replacing of the toner bottles to the closing of the cover for toner replacement can be provided to the user more appropriately. This reduces the likelihood that the user will make a mistake in the operation procedure in a case where the moving images of scenes for replacing toner bottles that have already been replaced are reproduced when the moving images are re-played in a state where the replacement of the toner bottles is in progress.

Also, transition from moving images of the operation procedure for up until the cover for toner replacement is opened to moving images showing operation procedure for replacing the toner bottles up until the closing of the cover for toner replacement is triggered by detection of the cover being opened by the sensor 305 of the cover 304 for toner replacement. This avoids situations in which the user does not notice the button operation for transitioning to the moving image showing the next procedure.

Also, the transition from the moving image showing the operation procedure for closing the cover for toner replacement to the moving image for operation procedure for opening the cover for toner replacement is not executed in a simple looping reproduction. So, there is an effect that after the toner bottle is replaced, the moving image showing the operation procedure for closing the cover for toner replacement can be reliably provided to the user.

Furthermore, the moving image showing the operation procedure for opening the cover for toner replacement and the moving image showing the operation procedure for closing the cover for toner replacement after the toner bottles are replaced are stopped in a state in which the cover for toner replacement is open and a state in which the cover for toner replacement is closed respectively. So, it is possible to provide the user with the minimum number of operations even if the user has missed some of the moving images (open/close operation of the cover for toner replacement).

Note, in the above described embodiment, a configuration is taken in which moving images corresponding to scenes according to the content of the moving image list are reproduced sequentially. However, the moving images corresponding to the scene in the moving image list may also be connected and reproduced in a single moving image. The same effects are obtained in such a case.

Also, configuration may be made so that the moving image files themselves are stored in a single file, index information corresponding to the scenes is used and the same processing as in the above described embodiment is performed.

Also as shown in FIG. 3B, instances of the toner bottle cover 306 exists behind the cover 304 for toner replacement. Opening and closing of the toner bottle cover 306 is detectable by a sensor (not shown). However, in the opening and closing of the toner bottle cover 306, the toner supply operation of step S716 is not performed. Accordingly, in a case where the scene to be reproduced is for the operation for closing the toner bottle cover 306, the determination result in step S719 is made to be NO, and the processing is moved to step S711.

Also, in step S720, the reproduction button 806 may be set so that it cannot be pressed, and a message indicating that it is necessary to close the cover 304 for toner replacement may be displayed in the message display area 805 when the moving image is being reproduced. By doing this, it becomes necessary to close the cover 304 for toner replacement in order to once again see the moving images, and the toner detection status can be reliably checked.

Also, in step S720, the content of the moving image list may be made to be only a scene for closing the cover 304 for toner replacement. In such as case, after pressing of the reproduction button 806 is determined in step S722, the moving image data acquired in step S711 is of the moving image corresponding to the scene for closing the cover 304 for toner replacement. With this, the user is urged to perform the operation of closing the cover 304 for toner replacement, and the toner detection status can be reliably updated.

Here, supplementary explanation for the close button 803 and the pause button 807, which was omitted from the above explanation, will be given.

The pressing of each button is obtained in step S705, and elsewhere, as an event to the CPU 201. In the event determination in step S706, and elsewhere, in a case where the close button 803 is pressed, the toner replacement screen 801 of FIG. 8 is closed. If a moving image is being reproduced at this time, the reproduction of the moving image is interrupted before the closing of the toner replacement screen 801. In such a case, the toner status is left as is in the memory 202.

In the event determination in step S706, and elsewhere, in a case where the pressing of the pause button 807 is determined, the moving image being reproduced is paused (the last frame to be reproduced is displayed continuously). In a case where pressing of the reproduction button 806 is detected after this, reproduction is initiated from the frame after the paused frame.

[Second Embodiment]

In the above described first embodiment, in a case where pressing of the reproduction button 806 is detected in step S721 or step S722, a moving image corresponding to operation for the replacement of the toner bottles and up until the closing of the cover 304 for toner replacement is reproduced. Here, in order to reflect in the moving image a toner bottle replacement status, display may be performed to indicate that it is necessary to close the cover 304.

Figure 11A:
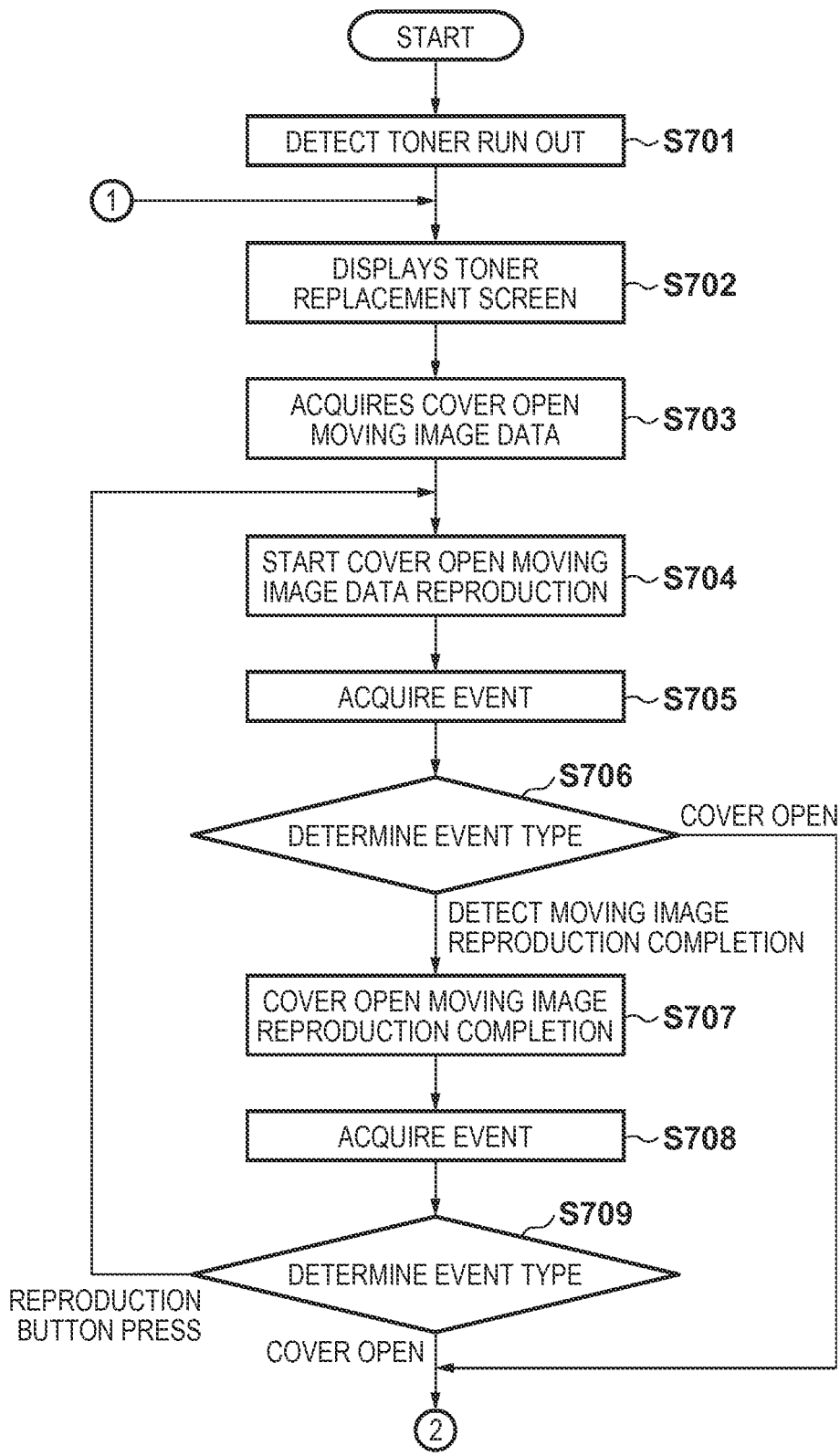
FIG. 11A and FIG. 11B are flowcharts for describing reproduction processing of a moving image for showing an operation procedure when toner runs out in the image forming apparatus according to a second embodiment.
Figure 11B:
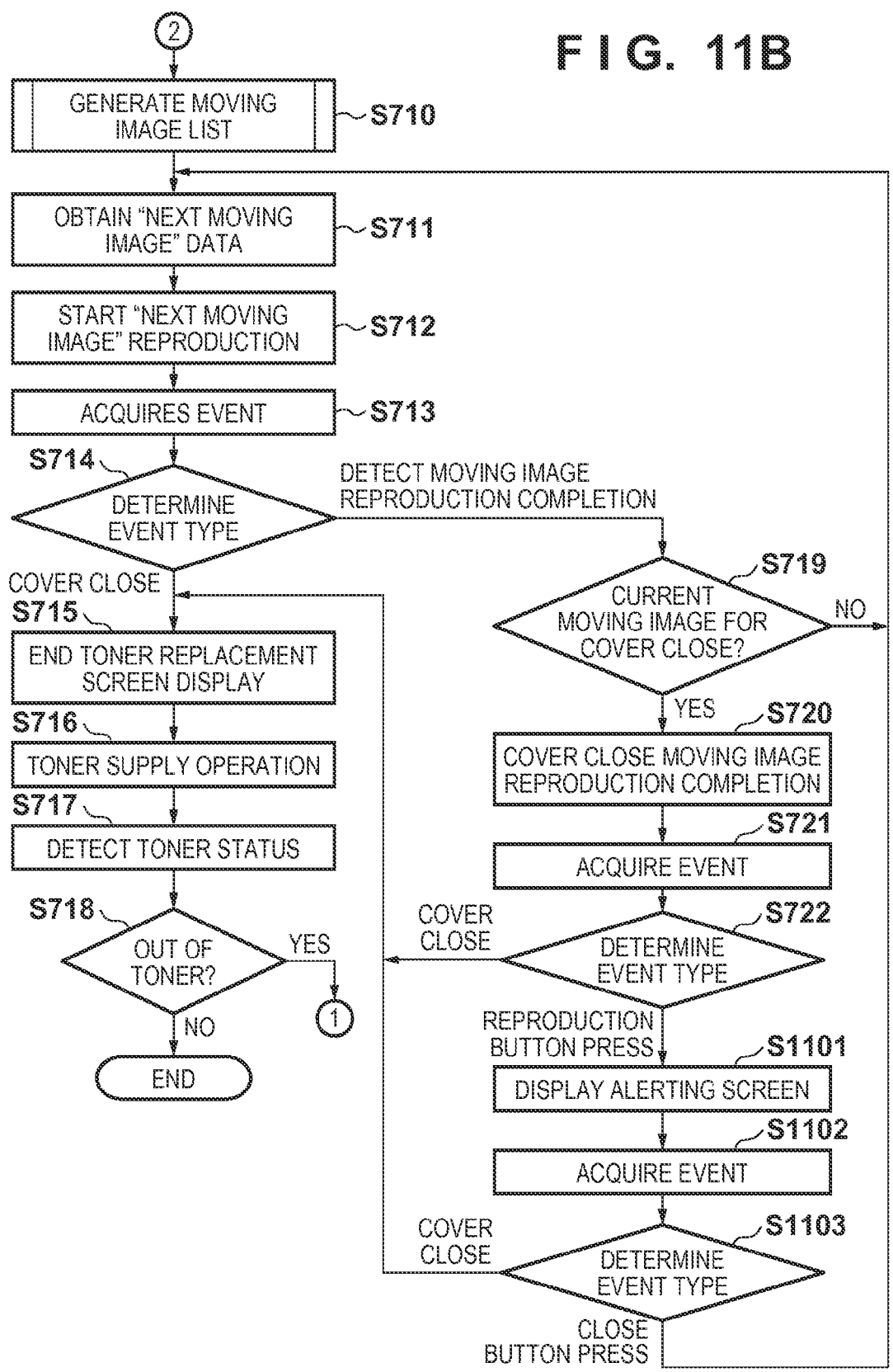

FIG. 11A and FIG. 11B are flowcharts for describing reproduction processing of a moving image for showing an operation procedure when toner runs out in the image forming apparatus according to a second embodiment. A program for executing this processing may be loaded into the memory 202 upon execution and executed under the control of the CPU 201.

Note, because the hardware configuration of the image forming apparatus according to the second embodiment is the same as in the previously described first embodiment, its explanation will be omitted. Also, in FIG. 11A and FIG. 11B, steps having the same processing as shown by the flowchart of previously described FIG. 7A and FIG. 7B are given the same reference numerals and explanation of these is omitted.

In FIG. 11A and FIG. 11B, if the type of the event is determined in step S722 to be for pressing of the reproduction button 806 of the moving image (reproduction button pressing), the processing is moved to step S1101. In step S1101, the CPU 201 displays an alerting screen onto the display unit 203.

Figure 12:
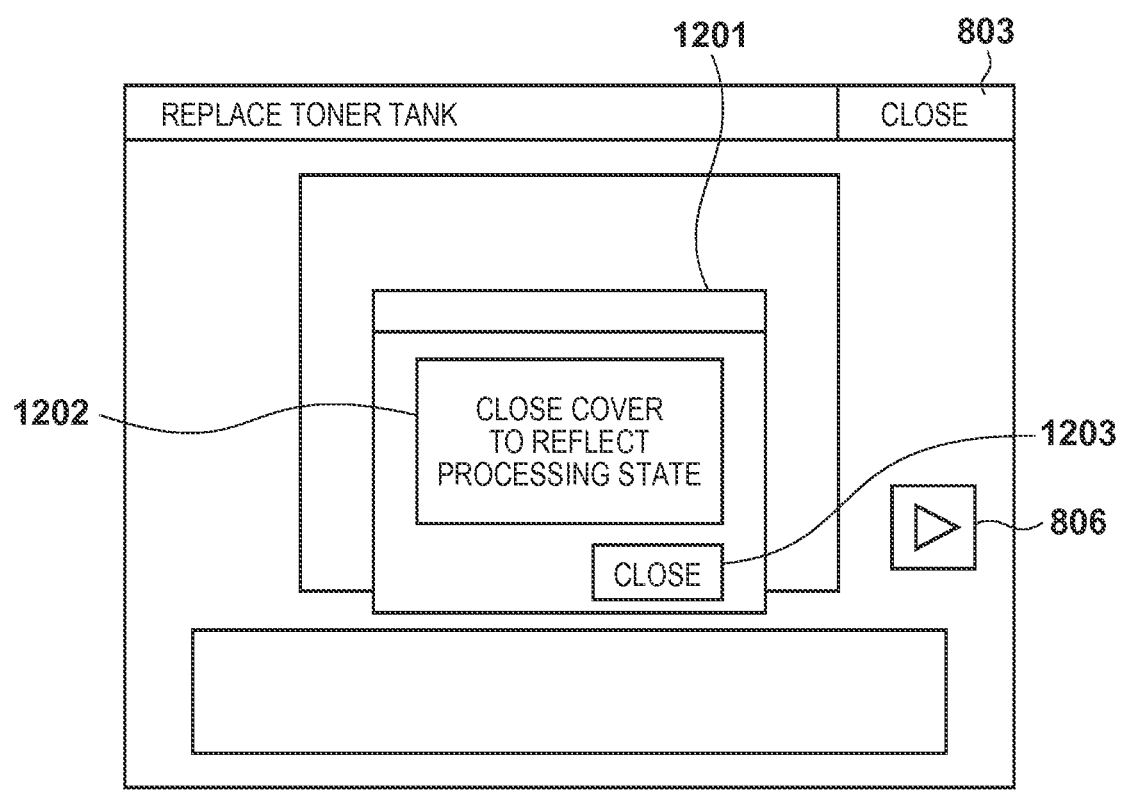
FIG. 12 is a view for showing an example of an alerting screen according to the second embodiment.

FIG. 12 is a view for showing an example of the alerting screen according to the second embodiment.

As shown in FIG. 12, an alerting screen 1201 is displayed overlapping the toner replacement screen 801 of FIG. 8. Here, the reproduction button 806 on the toner replacement screen 801, etc. is set to be invalid and so that it cannot be pressed. In the alerting screen 1201, a message area 1202 and a close button 1203 are arranged. In the message area 1202 a message indicating that it is necessary to perform the close operation on the cover in order to reflect the toner bottle replacement status in the moving image is displayed.

Next, the processing proceeds to step S1102, and the CPU 201 acquires an event sent in notification to the CPU 201. Next, the processing proceeds to step S1103, and the CPU 201 determines the type of the event obtained in step S1102. If the type of the event is for pressing of the close button 1203 (close button pressing), the processing is moved to step S711, after closing the alerting screen 1201 of FIG. 12. On the other hand, if the type of the event is for the operation for closing the cover 304 for toner replacement (cover closing), the processing is moved to step S715 after closing the alerting screen 1201 of FIG. 12.

In this way, in the second embodiment, after replacing of the toner bottles, a moving image showing the procedure for closing the cover 304 for toner replacement is displayed, and the reproduction display of the moving image is ended with the cover 304 not yet closed. Then, when the user instructs reproduction of the moving image, the user can be alerted to close the cover 304. So, the user, having seen this alert, has to press the close button 1203 on the alerting screen to be able to proceed to the next moving image reproduction. Because of this, it is possible to reliably instruct the user to close the cover 304 for toner replacement after the user has, for example, replaced a toner bottle.

[Third Embodiment]

Figure 13A:
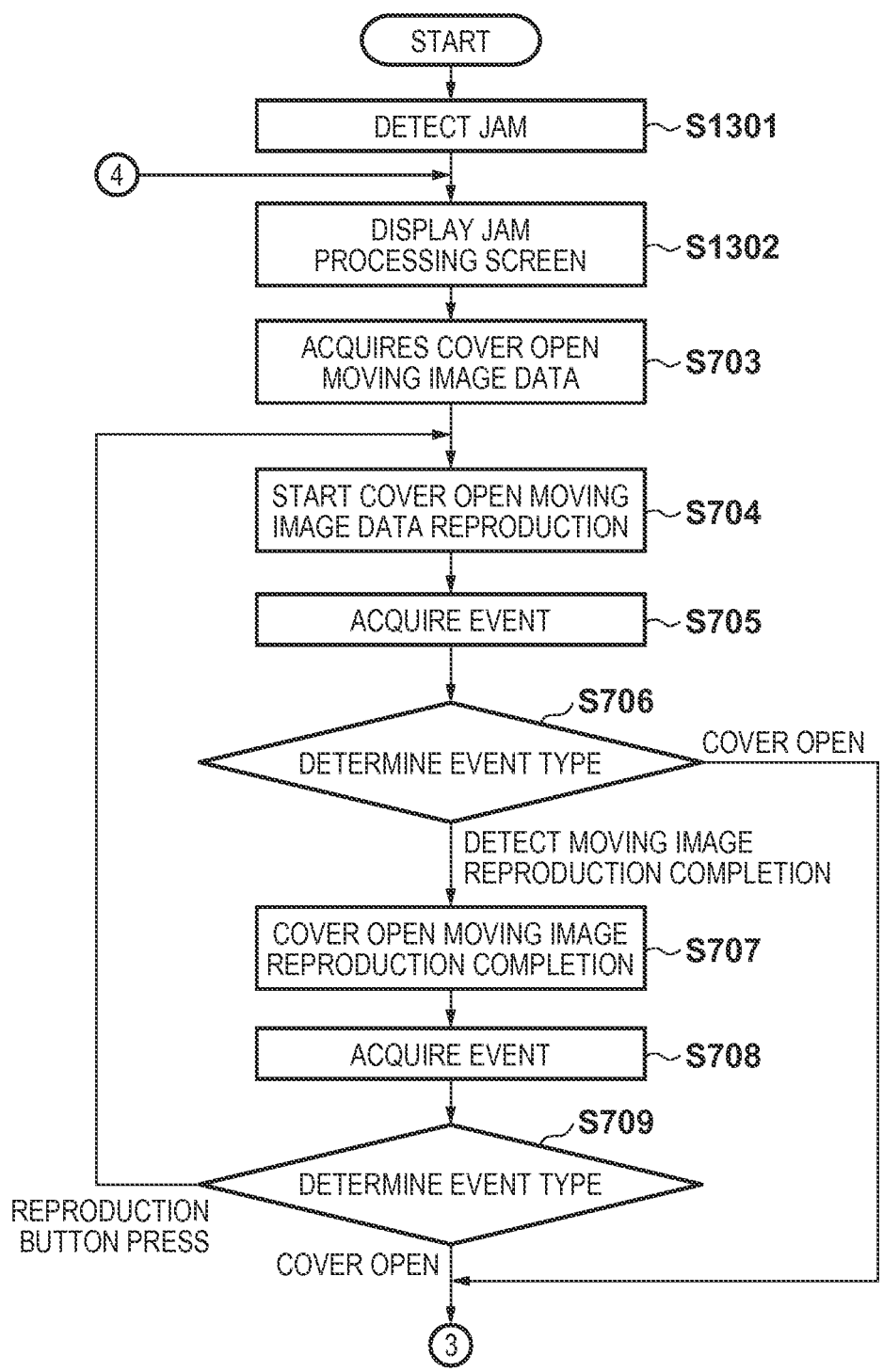
FIG. 13A and FIG. 13B are flowcharts for describing reproduction processing of a moving image for showing an operation procedure when a jam occurs in the image forming apparatus according to a third embodiment.
Figure 13B:
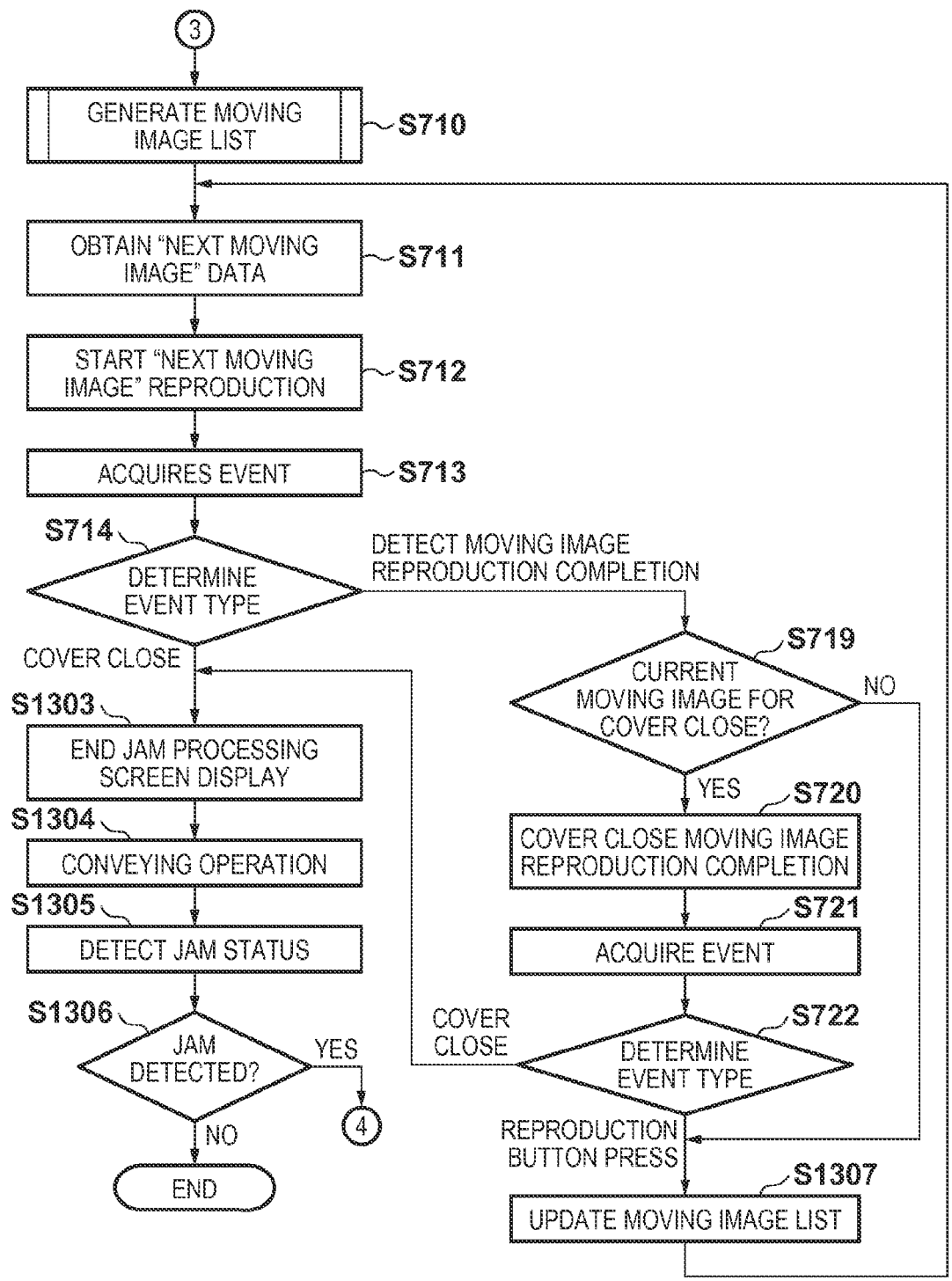

FIG. 13A and FIG. 13B are flowcharts for describing reproduction processing of a moving image for showing an operation procedure when a jam occurs in the image forming apparatus according to a third embodiment. A program for executing this processing may be loaded into the memory 202 upon execution and executed under the control of the CPU 201.

Note, because the hardware configuration of the image forming apparatus according to the third embodiment is the same as in the previously described first embodiment, its explanation will be omitted. Also, in FIG. 13A and FIG. 13B, steps having the same processing as shown by the flowchart of previously described FIG. 7A and FIG. 7B are given the same reference numerals and explanation of these is omitted.

Firstly, in step S1301, the CPU 201 detects a jam. Next, the processing proceeds to step S1302, and the CPU 201 displays a jam processing screen. A configuration of the jam processing screen is the same as the configuration of the toner replacement screen 801 of FIG. 8.

A moving image showing the procedure for opening the cover 307 of the main unit in order to get rid of the jam is displayed, and when the cover 307 is opened, in step S712, a moving image showing the procedure for closing the cover 307 is displayed. Next, in step S714, when the cover 307 is closed, the CPU 201 ends display of the jam processing screen in step S1303. Next, the processing proceeds to step S1304, and the CPU 201 performs sheet conveying processing. Next, the processing proceeds to step S1305 and the CPU 201 detects the jam status. Here, by the sheet conveying processing performed in step S1304, a jamming sheet left between the paper detection sensors is detected. Next, the processing proceeds to step S1306, and the CPU 201, in step S1305, determines whether or not a jam was detected, and in a case where a jam is detected, the processing proceeds to step S1302 whereas in a case where a jam is not detected, the processing ends.

As explained above, by the third embodiment, similarly to the case of toner running out, adaption to reproduction of moving images showing a jam cancellation procedure when a jam is detected.

Also, in the case of retention jamming, by monitoring the detection status of the paper detection sensor, jam cancellation is detectable without performing sheet conveyance. In the flowcharts of FIG. 13A and FIG. 13B, when the reproduction button is pressed in step S722, the processing proceeds to step S1307, and the moving image list is updated by removing scenes for which it was determined that the jam is cancelled for from the moving image list. By this, for example, when the reproduction button is pressed in step S722 but it is determined that the jam is cancelled, rather than once again reproducing the moving images for cancelling the jam, only the moving image for closing the cover 307 will be reproduced.

[Fourth Embodiment]

As described above, in the jam processing, there are cases in which jam cancellation is detectable without closing the cover 307 of the main unit. For this reason, after reproduction of the scene for closing the cover 307, reproduction of the first moving image of the moving image list may be initiated immediately. In other words, in the flowcharts of FIG. 13A and FIG. 13B, in a case where reproduction completion of the moving image is determined in step S714, the processing may immediately proceed to step S1307.

Furthermore, in this case, when showing a processing procedure for toner replacement, guidance is performed in accordance with the processing flow of FIG. 7A and FIG. 7B.

(Other Embodiments)

In the above explanation the examples of toner bottle replacement and jam processing were given. However, in cases where operation on a device by a user is detected, and based on the operation a detection status of the device is updated, the present invention may be applied for operation procedures dealing with other error states. For example, application may be made for replacement of recovery toner tanks or for replacement of staples. Also, application may be made for jam processing of feeders and ADFs and not just jam processing of the main unit.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-268809, filed Dec. 7, 2012, which is hereby incorporated by reference herein in its entirety.

What is claimed is:

1. An image forming apparatus, comprising:
a first detection unit configured to detect a toner outage;
a second detection unit configured to detect whether a cover for toner replacement is opened or closed;
a control unit configured to control, in accordance with the toner outage being detected by the first detection unit, so as to perform in order a reproduction of a first moving image for indicating a procedure for opening the cover for toner replacement, a reproduction of one or more second moving images for indicating a procedure for replacing toner, and a reproduction of a third moving image for indicating a procedure for closing the cover for toner replacement; and
a processing unit configured to perform processing for cancelling a toner outage in accordance with detection by the second detection unit that the cover for toner replacement is closed,
wherein the control unit controls so that if, in a case where the reproduction of the third moving image ends before the second detection unit detects that the cover for toner replacement is closed, a moving image reproduction instruction by a user is received, a reproduction of moving images is started from one of the one or more second moving images or from the third moving image without starting the reproduction of the first moving image.

2. The image forming apparatus according to claim 1, wherein the control unit does not perform the reproduction of the one or more second moving images until the second detection unit detects that the cover for toner replacement is opened.

3. The image forming apparatus according to claim 1, wherein the control unit controls so that if, in a case where the reproduction of the first moving image ends before the second detection unit detects that the cover for toner replacement is opened, a moving image reproduction instruction by a user is received, the reproduction of the first moving image is once again started.

4. The image forming apparatus according to claim 1, wherein the control unit ends reproduction of moving images when the second detection unit detects that the cover for toner replacement is closed.

5. The image forming apparatus according to claim 1, wherein the processing unit performs a supplying of toner.

6. The image forming apparatus according to claim 1, further comprising a reading unit configured to generate image data by reading an image on an original.

7. An image forming apparatus, comprising:
a first detection unit configured to detect a toner outage;
a second detection unit configured to detect whether a cover for toner replacement is opened or closed;
a control unit configured to control, in accordance with a toner outage being detected by the first detection unit, so as to perform in order a reproduction of a first moving image for indicating a procedure for opening the cover for toner replacement, a reproduction of one or more second moving images for indicating a procedure for replacing toner, and a reproduction of a third moving image for indicating a procedure for closing the cover for toner replacement;
a processing unit configured to perform processing for cancelling a toner outage in accordance with detection by the second detection unit that the cover for toner replacement is closed; and
an instruction unit configured to if, in a case where the reproduction of the third moving image ends before the second detection unit detects that the cover for toner replacement is closed, a moving image reproduction instruction is received from a user, instruct the user to close the cover for toner replacement.

8. The image forming apparatus according to claim 7, wherein the control unit controls so that the reproduction of the second moving image is not performed until the second detection unit detects that the cover for toner replacement is opened.

9. The image forming apparatus according to claim 7, wherein the control unit controls so that if, in a case where a reproduction of the first moving image ends before the second detection unit detects that the cover for toner replacement is opened, a moving image reproduction instruction by a user is received, the reproduction of the first moving image is once again started.

10. The image forming apparatus according to claim 7, wherein the control unit ends reproduction of moving images when the second detection unit detects that the cover for toner replacement is closed.

11. The image forming apparatus according to claim 7, wherein the processing unit performs a supplying of toner.

12. The image forming apparatus according to claim 7, further comprising a reading unit configured to generate image data by reading an image on an original.

13. A method of controlling an image forming apparatus, the method comprising:
    detecting a toner outage;
    detecting whether a cover for toner replacement is opened or closed;
    controlling, in accordance with the toner outage being detected, so as to perform in order a reproduction of a first moving image for indicating a procedure for opening the cover for toner replacement, a reproduction of one or more second moving images for indicating a procedure for replacing toner, and a reproduction of a third moving image for indicating a procedure for closing the cover for toner replacement; and
    performing processing for cancelling a toner outage in accordance with detection that the cover for toner replacement is closed,
    wherein the controlling controls so that if, in a case where the reproduction of the third moving image ends before it is detected that the cover for toner replacement is closed, a moving image reproduction instruction by a user is received, a reproduction of moving images is started from one of the one or more second moving images or from the third moving image without starting the reproduction of the first moving image.

14. A method of controlling an image forming apparatus, the method comprising:
    detecting a toner outage;
    detecting whether a cover for toner replacement is opened or closed;
    controlling, in accordance with a toner outage being detected, so as to perform in order a reproduction of a first moving image for indicating a procedure for opening the cover for toner replacement, a reproduction of one or more second moving images for indicating a procedure for replacing toner, and a reproduction of a third moving image for indicating a procedure for closing the cover for toner replacement;
    a processing step of performing processing for cancelling a toner outage in accordance with detection that the cover for toner replacement is closed; and
    if, in a case where the reproduction of the third moving image ends before it is detected that the cover for toner replacement is closed, a moving image reproduction instruction is received from a user, instructing the user to close the cover for toner replacement.

15. A non-transitory, computer-readable storage medium storing a program for causing a computer to execute a method of controlling an image processing apparatus, the method comprising:
    detecting a toner outage;
    detecting whether a cover for toner replacement is opened or closed;
    controlling, in accordance with the toner outage being detected, so as to perform in order a reproduction of a first moving image for indicating a procedure for opening the cover for toner replacement, a reproduction of one or more second moving images for indicating a procedure for replacing toner, and a reproduction of a third moving image for indicating a procedure for closing the cover for toner replacement; and
    performing processing for cancelling a toner outage in accordance with detection that the cover for toner replacement is closed,
    wherein the controlling controls so that if, in a case where the reproduction of the third moving image ends before it is detected that the cover for toner replacement is closed, a moving image reproduction instruction by a user is received, a reproduction of moving images is started from one of the one or more second moving images or from the third moving image without starting the reproduction of the first moving image.

16. A non-transitory, computer-readable storage medium storing a program for causing a computer to execute a method of controlling an image processing apparatus, the method comprising:
    detecting a toner outage;
    detecting whether a cover for toner replacement is opened or closed;
    controlling, in accordance with a toner outage being detected, so as to perform in order a reproduction of a first moving image for indicating a procedure for opening the cover for toner replacement, a reproduction of one or more second moving images for indicating a procedure for replacing toner, and a reproduction of a third moving image for indicating a procedure for closing the cover for toner replacement;
    a processing step of performing processing for cancelling a toner outage in accordance with detection that the cover for toner replacement is closed; and
    if, in a case where the reproduction of the third moving image ends before it is detected that the cover for toner replacement is closed, a moving image reproduction instruction is received from a user, instructing the user to close the cover for toner replacement.

* * * * *